United States Patent
Mann

(10) Patent No.: US 8,892,699 B2
(45) Date of Patent: Nov. 18, 2014

(54) AUTOMATIC FIRMWARE UPDATES FOR INTELLIGENT ELECTRONIC DEVICES

(75) Inventor: Cameron R. Mann, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 1131 days.

(21) Appl. No.: 12/347,726

(22) Filed: Dec. 31, 2008

(65) Prior Publication Data

US 2010/0169876 A1    Jul. 1, 2010

(51) Int. Cl.
G06F 15/177 (2006.01)
G06F 9/445 (2006.01)

(52) U.S. Cl.
CPC .................... *G06F 8/65* (2013.01)
USPC ........... 709/221; 709/222; 709/223; 709/224; 709/217

(58) Field of Classification Search
USPC .......................... 709/221, 222, 223, 224, 217
See application file for complete search history.

(56) References Cited

U.S. PATENT DOCUMENTS

| 5,467,286 | A | * | 11/1995 | Pyle et al. ........................ 702/62 |
| 6,167,567 | A | * | 12/2000 | Chiles et al. .................... 717/173 |
| 6,609,127 | B1 | * | 8/2003 | Lee et al. ............................... 1/1 |
| 6,944,555 | B2 | | 9/2005 | Blackett et al. ................. 702/62 |
| 7,085,824 | B2 | | 8/2006 | Forth et al. ..................... 709/221 |
| 8,024,724 | B2 | * | 9/2011 | Garrison et al. .............. 717/172 |
| 2003/0217357 | A1 | * | 11/2003 | Parry ............................. 717/168 |
| 2004/0073902 | A1 | * | 4/2004 | Kao et al. ....................... 717/171 |
| 2005/0055595 | A1 | * | 3/2005 | Frazer et al. ................... 713/400 |
| 2006/0075276 | A1 | * | 4/2006 | Kataria et al. .................... 714/4 |
| 2006/0130037 | A1 | * | 6/2006 | Mackay ......................... 717/168 |
| 2006/0174242 | A1 | * | 8/2006 | Zhu et al. ....................... 717/172 |
| 2007/0061800 | A1 | | 3/2007 | Cheng et al. |
| 2008/0005959 | A1 | * | 1/2008 | Chen et al. ........................ 47/1.4 |

(Continued)

FOREIGN PATENT DOCUMENTS

| CN | 101017435 A | 8/2007 |
| CN | 101060427 A | 10/2007 |

OTHER PUBLICATIONS

Written Opinion corresponding to co-pending International Patent Application Serial No. PCT/US2009/066947, European Patent Office; dated Mar. 23, 2010; 6 pages.

(Continued)

*Primary Examiner* — Lan-Dai T Truong
(74) *Attorney, Agent, or Firm* — Lando & Anastasi, LLP

(57) ABSTRACT

A method for automatically updating an existing firmware file stored in a memory of an intelligent electronic device (IED) communicatively coupled to a network in a monitoring system. The IED downloads from a remote server to the IED an update file that includes a version of a firmware file and a filename of the firmware file. The IED determines whether the firmware version specified in the update file is updated compared to a version of the existing firmware file. If the firmware version in the update file is greater than the existing version, the IED communicates to the remote server an instruction to download to the IED the updated firmware file specified in the update file. The IED receives from the remote server the updated firmware file. If a criterion is satisfied, the IED automatically updates the firmware file stored in its memory with the updated firmware file.

32 Claims, 4 Drawing Sheets

(56) References Cited

U.S. PATENT DOCUMENTS

| | | | |
|---|---|---|---|
| 2008/0059959 A1* | 3/2008 | Chen et al. | 717/168 |
| 2008/0065816 A1* | 3/2008 | Seo | 711/103 |
| 2008/0178170 A1* | 7/2008 | Abe et al. | 717/170 |
| 2008/0301249 A1* | 12/2008 | Etelapera | 709/206 |
| 2009/0007091 A1* | 1/2009 | Appiah et al. | 717/171 |
| 2010/0095293 A1* | 4/2010 | O'Neill et al. | 717/173 |

OTHER PUBLICATIONS

International Search Report corresponding to co-pending International Patent Application Serial No. PCT/US2009/066947, European Patent Office; dated Mar. 23, 2010; 3 pages.

Hewlett-Packard Company et al.: Method for Self Sync of Firmware in a Computer Network; dated Aug. 1, 2008; (4 pages).

* cited by examiner

AUTOMATIC FIRMWARE UPDATES FOR INTELLIGENT ELECTRONIC DEVICES

FIELD OF THE INVENTION

Aspects disclosed herein relate generally to intelligent electronic devices (IEDs), and, more particularly, systems and methods for automatically updating firmware in IEDs networked together.

BACKGROUND

Intelligent electronic devices used in utility monitoring systems typically include firmware that contains instructions for execution by a microcontroller in the IED. A typical monitoring system can include hundreds or even thousands of IEDs, and the IEDs are comprised of many different types (power or energy meters, circuit monitors, relays, circuit breakers, etc.) and can be made by different manufacturers. When a firmware update becomes available for an IED, it can be a logistical nightmare to keep track of which IEDs need to be updated, have already been updated, or are compatible with the firmware update. The possibility that commissioned IEDs will have outdated or mismatched firmware is high. Bug fixes to firmware may not reach every compatible IED. Under present systems, maintaining firmware for a large number of IEDs is very labor intensive and prone to mishandling and human error, resulting in sub-optimal performance and utilization of monitoring systems. There is also no automated way of determining whether updating one IED will cause incompatibility issues across the monitoring system.

What is needed, therefore, is a system and method for automatically updating firmware in a network of IEDs. The present disclosure is directed to addressing these and other needs.

BRIEF SUMMARY

This disclosure eliminates the need for an end-user of a utility monitoring system to manually update firmware for IEDs. It ensures that no single IED contains firmware that is only usable in a utility monitoring system with peer IEDs of equivalent firmware or greater. More specifically, the end-user is no longer tasked with the following and other tasks: monitoring the manufacturer's information outlets for notification of a firmware update, obtaining the firmware from the manufacturer of the IED, initiating the IED's firmware download and subsequent update, verifying that any updated firmware is compatible with the IED and with other IEDs, and handling interoperability issues caused by firmware changes. The end-user will invest less time maintaining firmware for the IEDs as a result. Because the firmware of all of the IEDs in the utility monitoring system will be up-to-date, additional benefits are realized, including: a larger cross-section of IEDs receives and utilizes performance enhancements, "bug fixes" can reach a greater number of IEDs, and a reduced number of IEDs in the field will possess outdated or mismatched firmware. The number of steps required to update an IED is drastically reduced by exploiting the networking and functional capabilities of the IED.

The novel system and method disclosed herein allows an IED to remotely and autonomously update its operating firmware, and enables the utility monitoring system to autonomously manage the updating of firmware among many devices. The automatic update functionality is supported by one or more servers that can be maintained by a manufacturer of the IEDs. The IED executes the update actions within the boundaries of a set of parameters. These parameters are defined by the user and a configuration text file (called an "update file") that accompanies every firmware download. Specifically, this disclosure includes the following principal system components (among others): a firmware file, an update (text) file, one or more remote (FTP) servers that retain firmware for the IEDs in the utility monitoring system, and an IED. The following functional capabilities and advantages are realized, among others: user notification options, firmware compatibility verification, system interoperability checks (SIC), and firmware integrity checks.

According to an aspect of the present disclosure, a method of automatically updating an existing firmware file stored in a memory of an intelligent electronic device (IED) communicatively coupled to a network in a monitoring system, includes: downloading, by the IED, from a remote server an update file that includes a version of a firmware file and a filename of the firmware file; determining, in the IED, whether the firmware version specified in the update file is updated compared to a version of the existing firmware file; responsive to the firmware version specified in the update file being updated compared to the version of the existing firmware file, communicating from the IED to the remote server an instruction to download to the IED the updated firmware file specified in the update file; receiving at the IED from the remote server the updated firmware file; and responsive to a first criterion being satisfied, automatically updating the firmware file stored in the memory of the IED with the updated firmware file.

The update file can further include an interoperability flag indicating to the IED whether to notify other compatible IEDs in the network that the firmware update is available. The first criterion can be satisfied in response to the interoperability flag indicating that the IED notify the other compatible IEDs in the network that the firmware update is available.

The method can further include measuring an electrical characteristic via a sensor in the IED and producing, by the IED, data representing the measured electrical characteristic. The remote server can be a remote file transfer protocol (FTP) server, and the communicating to the remote FTP server can include communicating authentication information to an Internet Protocol (IP) address of the remote FTP server. A folder on the remote FTP server in which the updated firmware file is stored can contain the updated firmware file and the update file.

The first criterion can be whether a firmware compatibility parameter is satisfied. The firmware compatibility parameter indicates whether the updated firmware file is compatible with the IED. The first criterion can be whether the firmware version of the firmware file specified in the update file is newer than the version of the existing firmware file. The first criterion is whether the updated firmware file includes any errors as determined by an error detecting code applied to the updated firmware file. The update file can further include a cycle redundancy check (CRC) number associated with the updated firmware file.

The method can further include, in response to the CRC number indicating an error in the updated firmware file, re-attempting to download from the remote server a predetermined number of tries the updated firmware file until the updated firmware file satisfies the cyclic redundancy check. The update file further can include a firmware compatibility parameter indicating whether the updated firmware file is compatible with the IED.

The update file further can include a release date of the updated firmware file, a cyclic redundancy check number associated with the updated firmware file, and a firmware compatibility parameter indicating whether the updated firmware file is compatible with the IED. The update file can further include a release date of the updated firmware file.

The method can further include storing, in the memory of the IED, a representation of a hierarchy of the IEDs coupled to the network, the hierarchy indicating how the IEDs are linked to one another in the monitoring system and their relative locations in the hierarchy to one another. The interoperability flag can indicate that the IED is to notify the other compatible IEDs. The method can further include, responsive to the automatically updating the firmware file stored in the memory of the IED, transmitting, from the IED to a second IED in the network, the second IED being compatible with the IED, an instruction to the second IED to cause the second IED to update an existing firmware file stored in the second IED.

The method can further include, prior to the transmitting the instruction to the second IED, scanning the network within a predetermined address range to build an interoperability list that includes, for each of the IEDs in the network, a network address of each of the IEDs in the network and an associated system position of each of the IEDs in the hierarchy. The method can further include: receiving, at the IED, from the second IED a string read from a predetermined register in the memory of the second IED, the string representing the system position of the second IED in the hierarchy; and responsive to the receiving the string, storing, in the interoperability list, the network address of the second IED and the system position of the second IED.

The method can further include, prior to the transmitting the instruction to the second IED, reading the interoperability list by the IED to determine the network address of the second IED and the associated system position of the second IED in the hierarchy. The second IED can be the topmost IED in the hierarchy.

The method can further include, responsive to the second IED updating the firmware file stored in the second IED, transmitting, from the second IED to a third IED in the network, the third IED being compatible with the IED, the instruction to cause the third IED to update an existing firmware file stored in the third IED. The method can further include transmitting, from the IED to a fourth IED in the network, the fourth IED being compatible with the IED and downstream of the IED in the hierarchy, the instruction to cause the fourth IED to update an existing firmware file stored in the fourth IED.

The IED can be an Ethernet-enabled power monitoring or control device that includes an Ethernet port. The method can further include communicating via the IED a notification indicating the availability of the firmware update. The method can further include receiving, at the IED, a selection of an update option indicating whether to download the updated firmware file or whether to install the updated firmware file.

The update option can indicate a first option to send a notification that the updated firmware file is available and download the updated firmware file to the IED or a second option to send a notification that the updated firmware file is available and to both download the updated firmware file to the IED and automatically install the updated firmware file on the IED or a third option to neither download the updated firmware file to the IED nor install the updated firmware file on the IED and to send only a notification that the updated firmware file is available.

The receiving from the remote server the updated firmware file can be initiated responsive to receiving an indication from a user locally to the IED or remotely from the IED to download the updated firmware file to the IED. The communicating the notification can be carried out according to a network time protocol (NTP), a simple mail transport protocol (SMTP), a short message service (SMS) protocol, or a Modbus serial communications protocol over a transmission control protocol (Modbus/TCP). The IED can include a modem that is operable in a global system for mobile communications (GSM) network.

The notification can further include an internet protocol (IP) address of the IED, a date and time that the notification was constructed, the version of the existing firmware file stored in the memory of the IED, and the firmware version of the updated firmware file. The notification can further include a location of the IED in the network and a model number of the IED. The notification can further include a release date of the firmware update.

The interoperability flag can indicate that the IED is to notify the other compatible IEDs. The method can further include: determining a topmost IED of the IEDs in the hierarchy that is compatible with the firmware update; responsive to determining the topmost IED, causing the topmost IED to update a firmware file in the topmost IED with the updated firmware file; receiving, at a next IED immediately downstream of the topmost IED, an indication from the topmost IED that the updated firmware file has been installed in the topmost IED; and causing the next IED to update a firmware file in the next IED with the updated firmware file.

The IED can be at the topmost position in the hierarchy of the monitoring system. The method can further include: responsive to the automatically updating the firmware file stored in the memory of the topmost IED, causing another IED immediately downstream of the topmost IED to be upgraded; responsive to the first criterion not being satisfied, ceasing to attempt to upgrade any other IEDs in the hierarchy until the topmost IED has successfully updated to the updated firmware file. Prior to the automatically updating the firmware file, the method can further include polling an IED upstream of the IED in the hierarchy until an indication is received from the upstream IED that it has updated its firmware. The method can further include: responsive to receiving the indication that the upstream IED has updated its firmware, carrying out the automatically updating; and responsive to receiving no indication that the upstream IED has updated its firmware despite a predetermined number of unsuccessful attempts to contact the upstream IED, transmitting by the IED a failure notification indicating that the firmware file of the IED could not be updated.

The method can further include: querying a host computer coupled to the network whether the firmware update is compatible with the monitoring system; and responsive to receiving an indication from the host computer that the firmware update is not compatible with the monitoring system, communicating an indication that the firmware update is not compatible with the monitoring system. The host computer can search a compatibility checklist to determine whether the firmware update if installed on the IED would be compatible with the monitoring system. The firmware update may not be compatible with the monitoring system if the firmware update would render a data field corresponding to the IED data inoperable or unreadable. Alternately, the firmware update may not be compatible with the monitoring system if the firmware update would cause a custom configuration parameter of the IED to be overwritten.

According to another implementation of the present disclosure, a method of automatically updating a firmware file stored in a memory of an intelligent electronic device (IED) communicatively coupled to a network in a monitoring system, includes: receiving at the IED from a second IED coupled to the network in the monitoring system an indication to update the firmware file stored in the memory of the IED; responsive to the IED receiving the indication from the second IED, receiving at the IED from a remote server an updated firmware file; and automatically updating the firmware file stored in the memory of the IED with the updated firmware file. The method can further include: measuring an electrical characteristic via a sensor in the IED and producing, by the IED, data representing the measured electrical characteristic; receiving from the remote server an update file that includes a version of the updated firmware file, a release date of the updated firmware file, a file name of the updated firmware file, a firmware compatibility parameter, and an interoperability flag indicating to the IED whether to notify other compatible IEDs in the network that a firmware update is available, the firmware compatibility parameter indicating whether the updated firmware file is compatible with the IED; and responsive to receiving the update file, communicating from the IED to the remote server an instruction to download to the IED the updated firmware file.

The foregoing and additional aspects and implementations of this disclosure will be apparent to those of ordinary skill in the art in view of the detailed description of various embodiments and implementations, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
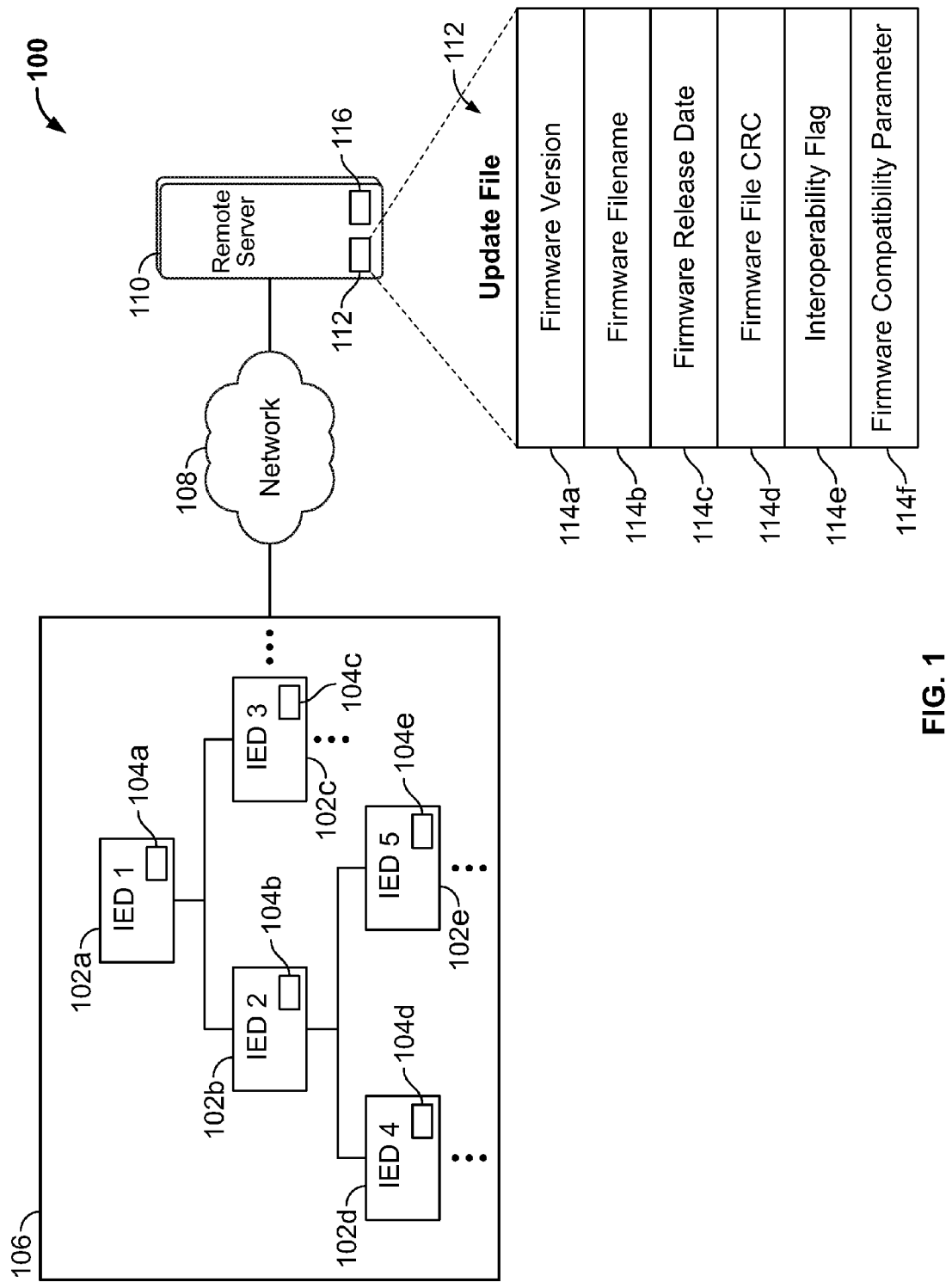
FIG. 1 is a functional block diagram of a utility monitoring system having multiple IEDs coupled to a remote server via a network for receiving automatic firmware updates.

While this disclosure is susceptible to various modifications and alternative forms, specific embodiments and implementations have been shown by way of example in the drawings and will be described in detail herein. It should be understood, however, that this disclosure is not intended to be limited to the particular forms disclosed. Rather, this disclosure is to cover all modifications, equivalents, and alternatives falling within the spirit and scope of this disclosure as defined by the appended claims.

DETAILED DESCRIPTION

Turning now to FIG. 1, a utility system 100 is shown including a utility monitoring system 106, a network 108, and one or more remote servers 110. The utility monitoring system 106 includes multiple IEDs 102a-e each coupled to the one or more remote servers 110 via the network 108. Each of the IEDs 102a-e includes a respective rewriteable memory 104a-e (such as EEPROM or flash memory) for storing firmware that is executed by a respective microcontroller (not shown) in the IED. The reference number 102 shall be used herein to refer to any of the IEDs 102a-e. Likewise, the reference number 104 refers to any of the memory 104a-e. For example, the IED 102 can have the ability to sample, collect, or measure one or more operational characteristics of a utility system. The utility being monitored by the utility monitoring system 106 can be any of the five utilities designated by the acronym WAGES, or water, air, gas, electricity, or steam. Examples of the operational characteristics that can be monitored by the utility monitoring system 106 include, in the electrical context, current, voltage, power, or energy, to name a few. In other contexts, the operational characteristics can include volumetric flow rates, mass flow rates, volumetric flux, mass flux, and the like, to name a few. In the electrical utility context, the IED can be based on a POWERLOGIC® Series CM3xxx/CM4xxx Circuit Monitor or a POWERLOGIC® PM7xx/8xx or ION7550/7650 Power and Energy Meter available from Schneider Electric or any other suitable monitoring device (e.g., circuit monitor), a circuit breaker, a relay, a metering device, or a power meter. Such devices conventionally include a sensor that measures an electrical characteristic and produce data representing the measured electrical characteristic. The IED can be a gateway device, such as an EGX Ethernet gateway available from Schneider Electric, that does not monitor or measure a characteristic of the utility system. Such a device can be referred to herein as an "Ethernet-enabled device" or an EED. A few other examples of IEDs include a Micrologic® Trip Unit, a programmable logic controller (PLC), a Remote Terminal Unit (RTU), a fault recorder, a gateway, such as an EGX Ethernet-to-Serial gateway available from Schneider Electric, or a protection relay. Any combination of these devices can exist in the utility monitoring system 106. The IED includes hardware that enables connectivity to the network 108 via a network connection, such as an Ethernet connection.

The remote server 110 includes one or more firmware files 116 and one or more associated update files 112. An exemplary update file 112 is shown in FIG. 1. The update file 112 includes any one or more of the following parameters in no particular order: firmware version 114a (the version of the firmware file 116), firmware filename 114b (including its extension, such as 2000eed.bin), firmware release date 114c (the release date of the firmware file 116), a firmware file cycle redundancy check (CRC) number 114d of the associated firmware file 116, an interoperability flag 114e indicating whether to notify other compatible IEDs in the network 108 that a firmware update is available, described in more detail below, and/or a firmware compatibility parameter (FCP) 114f indicating whether the firmware file 116 is compatible with the IED, also described in more detail below. It should be emphasized that not all of these parameters need to be included in the update file 112, and the update file 112 can include other parameters.

The firmware file 116 is provided by the manufacturer of the IED 102 in the format required by the IED 102. The filename 114b is unique for each new version of the firmware and a numerical indication of the version is provided within the filename 114b. For example, the name 2000eed.bin indicates that this firmware file corresponds to version 2.000.

The update file 112 generally can be a text file that includes the parameters mentioned above. The update file 112 is first downloaded by the IED before the firmware file 116 is downloaded.

The firmware version 114a is used by the IED 102 for comparison between the version of the existing firmware 104 in the IED 102 and the version on the remote server 110 to determine whether an update is necessary. The filename is also used to perform the FTP operations to retrieve the updated firmware file from the remote server 110.

The firmware release date 114c is used in a notification message that can be broadcast by the IED to the user indicating that a firmware update is available. These update or notification options are discussed in more detail below.

The firmware file CRC 114d is used to check the firmware file 116 for potential corruption after downloading it from the remote server 110.

The interoperability flag 114e is used by the IED 102 to assess whether it should notify other devices in the utility monitoring system 106 in the system hierarchy to update their firmware to the latest version.

The FCP 114f allows the IED 102 to check whether the new firmware file 116 is compatible with the IED 102.

The one or more remote servers 110 are preferably operated and maintained by the manufacturer of the IEDs 102. The remote server's FTP address is provided by the manufacturer, and directs the IEDs 102 to a specific folder on the remote server 110 where the update file 112 and the firmware file 116 are stored for the particular IED 102 that is seeking the updated firmware file. For authentication to gain access to the remote server 110, a preferred username and password are assigned by the manufacture, such as the device's product name (e.g., METER3000 or DEVICE123). No old or outdated firmware will be retained in this folder, and no additional files or folders are present in the root folder on the remote server 110. The update file 112 and the firmware file 116 are updated simultaneously when a new firmware version is released by the manufacturer.

The IED 102 is the only segment of the system 100 that actively monitors the remote server 110 for new firmware, and that notifies the user when the firmware is available for download. The memory 104 in the IED 102 is preferably non-volatile to store the downloaded firmware 116 from the remote server 110 and the associated update file 112 so that operations can be executed by the IED 102 that utilize the parameters 114a-f in the update file 112. The IED 102 preferably includes a graphical user interface for location configuration, and an HTTP user interface for remote configuration. The IED 102 can communicate notifications of new firmware according to a network time protocol (NTP), a simple mail transport protocol (SMTP), a short message service (SMS) protocol, or a Modbus serial communications protocol over a transmission control protocol (Modbus/TCP). The IED 102 can also include a model that is operable in a global system for mobile communications (GSM) network, such that the notifications can be transmitted wirelessly via the transport mechanisms SMTP or SMS.

The message transmitted by the IED 102 includes any combination of the following: the internet protocol (IP) address of the IED 102, the date and time of the message construction, and a system description that includes the location of the IED 102 in a hierarchy of the utility monitoring system 106, a model number of the IED 102, and the current version of the existing firmware stored in the memory 104. The body of the message includes an indication that a new version of firmware (version "x.xx") has been found and was released on a release date "m/d/yyyy." The message template can vary depending upon the character limits of the SMS message.

The user can also set various polling options via the IED 102, including a polling interval (minutes, seconds, hours, days, weeks, etc.) indicating how frequently to check whether a firmware update exists on the remote server 110, and a number of retries after an update error occurs due to a CRC check error, or an FTP error.

The user can also configure "update options" that define how the IED 102 will notify the user when new firmware is found. The update options are configurable via the user interfaces mentioned above. The user is provided with a list of update options via the user interface including: (1) a first option to send a notification that the updated firmware file 116 is available and download the updated firmware file 116 to the IED 102; (2) a second option to send a notification that the updated firmware file 116 is available and to both download the updated firmware file 116 to the IED 102 and automatically install the updated firmware file 116 on the IED 102; and (3) a third option to neither download the updated firmware file 116 to the IED 102 nor install the updated firmware file 116 on the IED 102 and to send only a notification that the updated firmware file 116 is available. The user can also select the preferred transport method of the notification messages, such as SMTP, SMS, or "no message." The user notification system will be activated only if the firmware version is greater than the one currently existing in the memory 104 of the IED 102. If the version is no longer compatible (as determined by the FCP parameter 114f), the IED 102 notifies the user that a new version is released but is not compatible with the IED 102.

The IED 102 analyzes the FCP parameter 114f in the update file 112 to determine whether its own hardware/software platform can accept the new version of the firmware 116. In an example, the FCP parameter 114f corresponds to a minimum original manufacturer version that will be supported by the IED 102. The FCP parameter 114f addresses legacy issues with the IEDs as they are deployed over time. The IED retains in the memory 104 the original version of the firmware when it was released by the manufacturer. If the version specified in the FCP parameter 114f is greater than the original version of the firmware of the IED 102, the IED 102 will not download the new firmware file 116 from the remote server 110, and notifies the user of the error. For example, if the firmware running on the IED 102 is presently version 5.000, and the original version of the IED 102 when released from the manufacturer was 2.300. Suppose the new firmware version is 7.500, and the FCP parameter 114f is 2.500 (specifying the minimum version that the new firmware file 116 is compatible with). The new firmware file 116 is not compatible with the IED 102, because only devices originally manufactured with version 2.500 and higher will support this version of the new firmware (i.e., version 7.500). Had the FCP parameter 114f been 2.300, the IED would have been able to download the new firmware file 116 from the remote server 110.

The FCP parameter 114f ensure intra-device compatibility, but inter-device compatibility is important to the operation of the entire monitoring system 106. The purpose of the system interoperability checks (SIC) is to ensure that firmware is not downloaded to a number of IEDs in the monitoring system 106 that unintentionally renders the monitoring system 106 partially or wholly inoperable due to firmware incompatibility among the IEDs, such as caused by modified commands or communication parameters. In this respect, managing the order in which firmware is downloaded within a system hierarchy is important, particularly in large monitoring systems 106 comprising hundreds of IEDs. The IED 102 stores a data representation of a hierarchy of the IEDs coupled to the network 108. The hierarchy indicates how the IEDs 102 are linked to one another in the utility monitoring system 106 and their relative locations in the hierarchy to one another. For example, in FIG. 1, the IED 102a is considered to be the topmost IED in the hierarchy. IEDs 102b,c are immediately downstream of the IED 102a, and IEDs 102d,e are immediately downstream of the IED 102b.

The IED 102 uses the interoperability flag parameter 114e in the update file 112 to determine whether other IEDs in the monitoring system 106 should be notified of the available firmware update. The interoperability flag 114e is true or false. If false, do nothing. If true, the IED 102 is to notify other compatible IEDs according to their order in the hierarchy after updating the system firmware. The IED 102 can provide an option to enable or disable this notification option via the user interfaces disclosed above.

Figure 2:
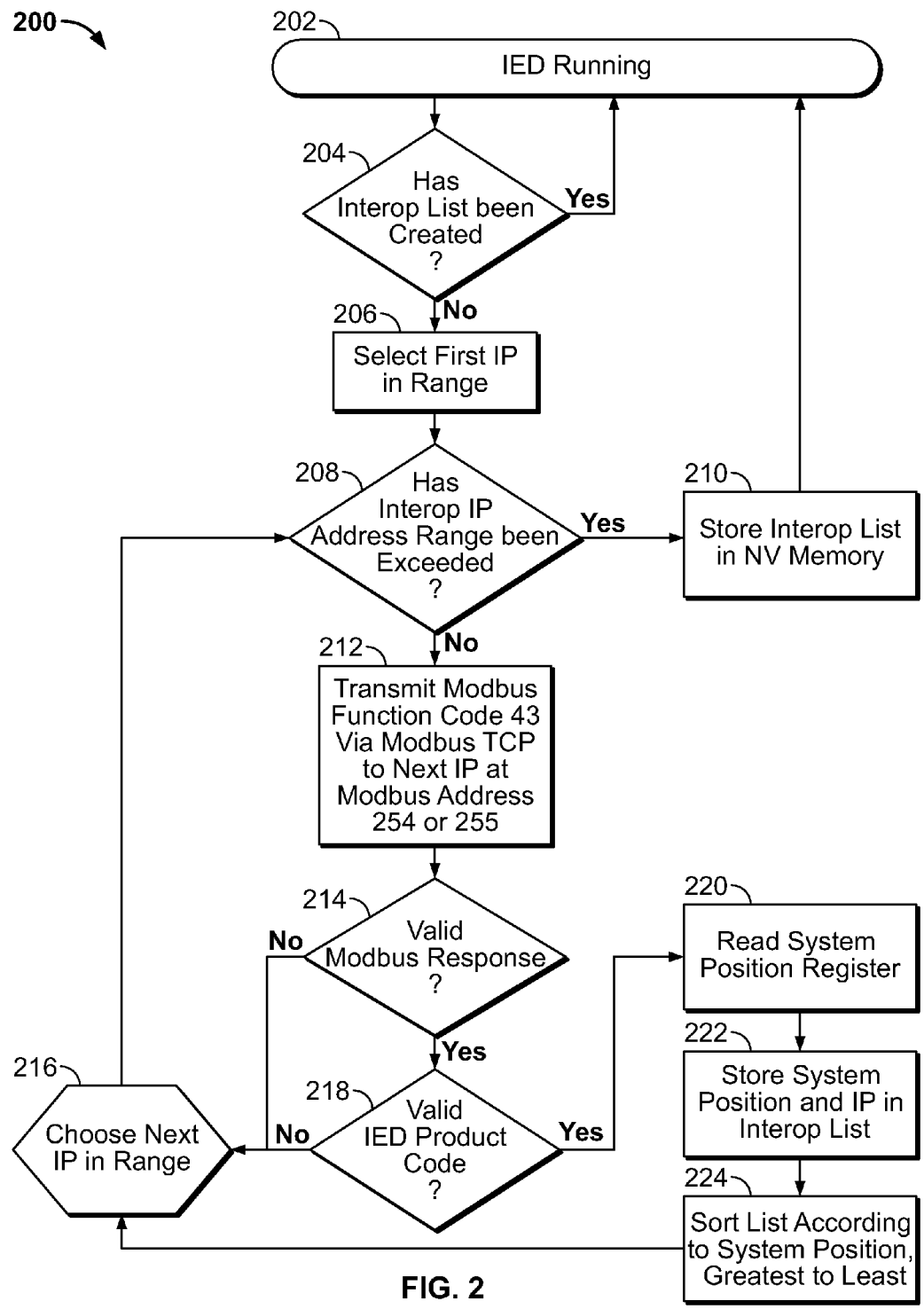
FIG. 2 is a flow chart diagram of an algorithm for developing an interoperability list according to aspects of the present disclosure.

Referring to FIG. 2, a flow chart of an interoperability list algorithm 200 is shown. While the IED is running (202), to notify other IEDs in the monitoring system 106, the finder of the new firmware (referred to as the "seed" IED, which in this example is IED 102*b*) needs to obtain the network addresses of the IEDs 102 and the positions of the IEDs 102 in the overall system hierarchy. To obtain the network addresses of the IEDs 102, the user defines an IP address range during device setup so that the IED 102 can scan the network 108 and build a list of other IEDs in the monitoring system 106. The IED 102 determines whether an interoperability list has been created (204). If not, the IED 102 selects the first IP in the user-specified range of IP addresses (206). The seed IED 102*b* cycles through the IP addresses of the other IEDs 102*a, c-e* (208, 212, 214, 216, 218), using Modbus address 254 or 255 and exercises Function Code 43 (Read Device Identification) (212) in an example. The IED 102*b* analyzes the ProductCode Object Name for a valid IED-specific string (218). When a valid reply is received from an IED, the IED 102*b* reads a universal system position register ID within the found IED (220). This is an integer value defined by the user via the user interface that assigns a numerical "position" within the hierarchy to an IED. Once the integer value is read by the IED 102*b*, the IP address and position ID is stored in the interoperability list (222). As more IEDs are found, their corresponding IP addresses and position IDs are stored in the list and sorted according to position ID (224). The interoperability list is stored in the non-volatile memory 104 of the IED 102 (210).

Once a firmware update is completed by IED 102*b*, it sends a proprietary Modbus TCP command (in an example) to the topmost IED 102*a* in the hierarchy and to the IED 102*d* immediately downstream of the IED 102*b*. The command instructs the receiving IED to begin the automatic update sequence, bypassing the server polling interval. As each IED completes its update, it sends the update command to the corresponding downstream device. Accordingly, an update begins at a central point in the hierarchy, e.g., at IED 102*b*, expanding immediately downstream and top-down in the system hierarchy. The IEDs 102 include logic to instruct the IEDs that if they have received the update command before the last firmware update, the IED will not attempt to notify the topmost IED 102*a* in the hierarchy. Only the "seed" IED 102*b* that had not received the update command before the last firmware update is allowed to transmit the command to the topmost IED 102*a*.

Thus, regardless of the position of the original seed IED, IED 102*b* in this example, the monitoring system 106 is updated in a top-down sequence, starting with the seed IED 102*b* then proceeding to the topmost IED 102*a* and down the hierarchy until it terminates at the seed IED 102*b* and at the end of the hierarchy (e.g., with IED 102*e*). Should an IED, which has already initiated the automatic update sequence, receive the update command, the IED will ignore the update command and proceed with the update per the polling interval specified by the automatic update sequence.

Figure 3A:
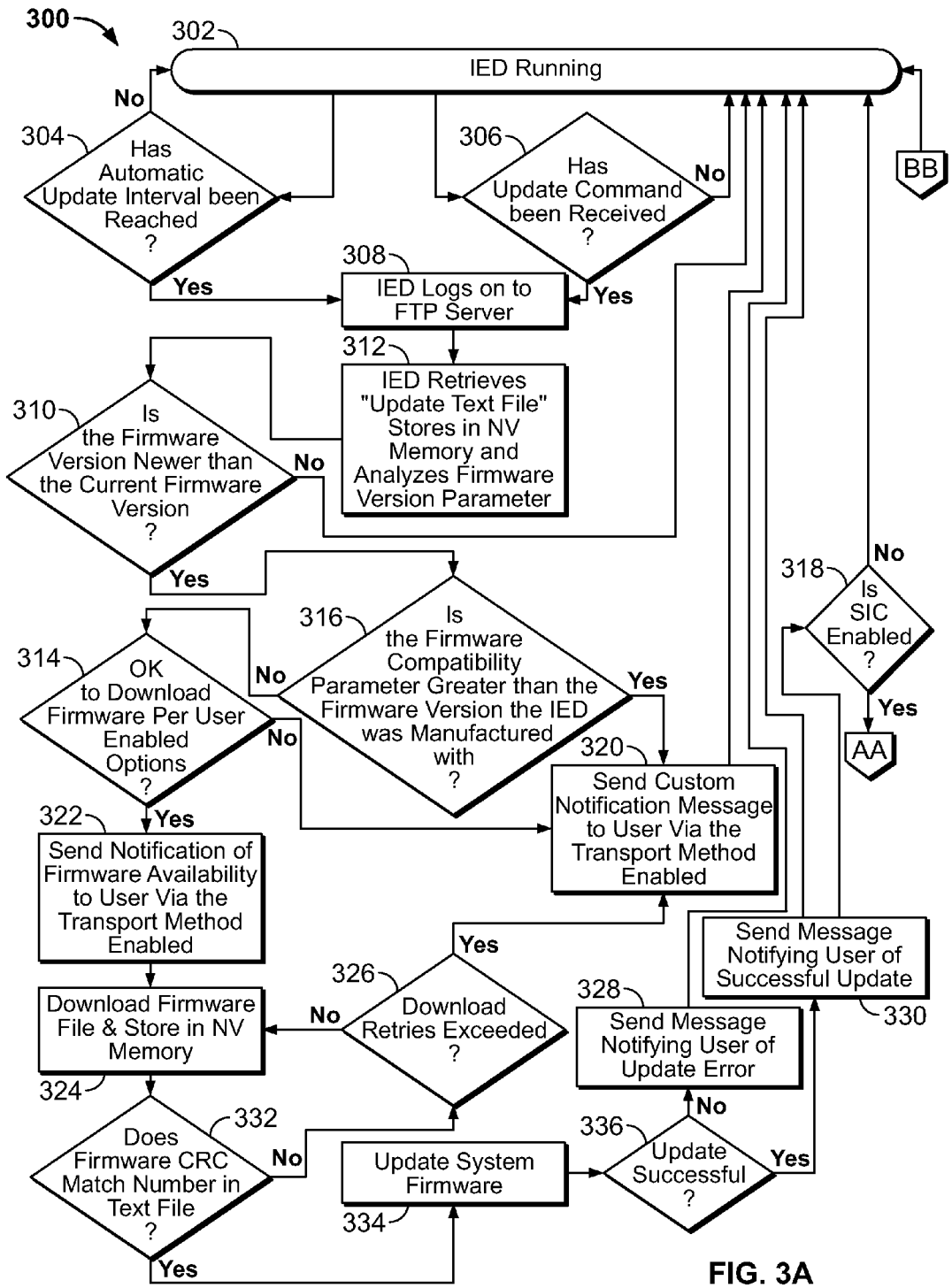
FIGS. 3A-3B are a flow chart diagram of an algorithm for automatically updating firmware in multiple IEDs according to aspects of the present disclosure.
Figure 3B:
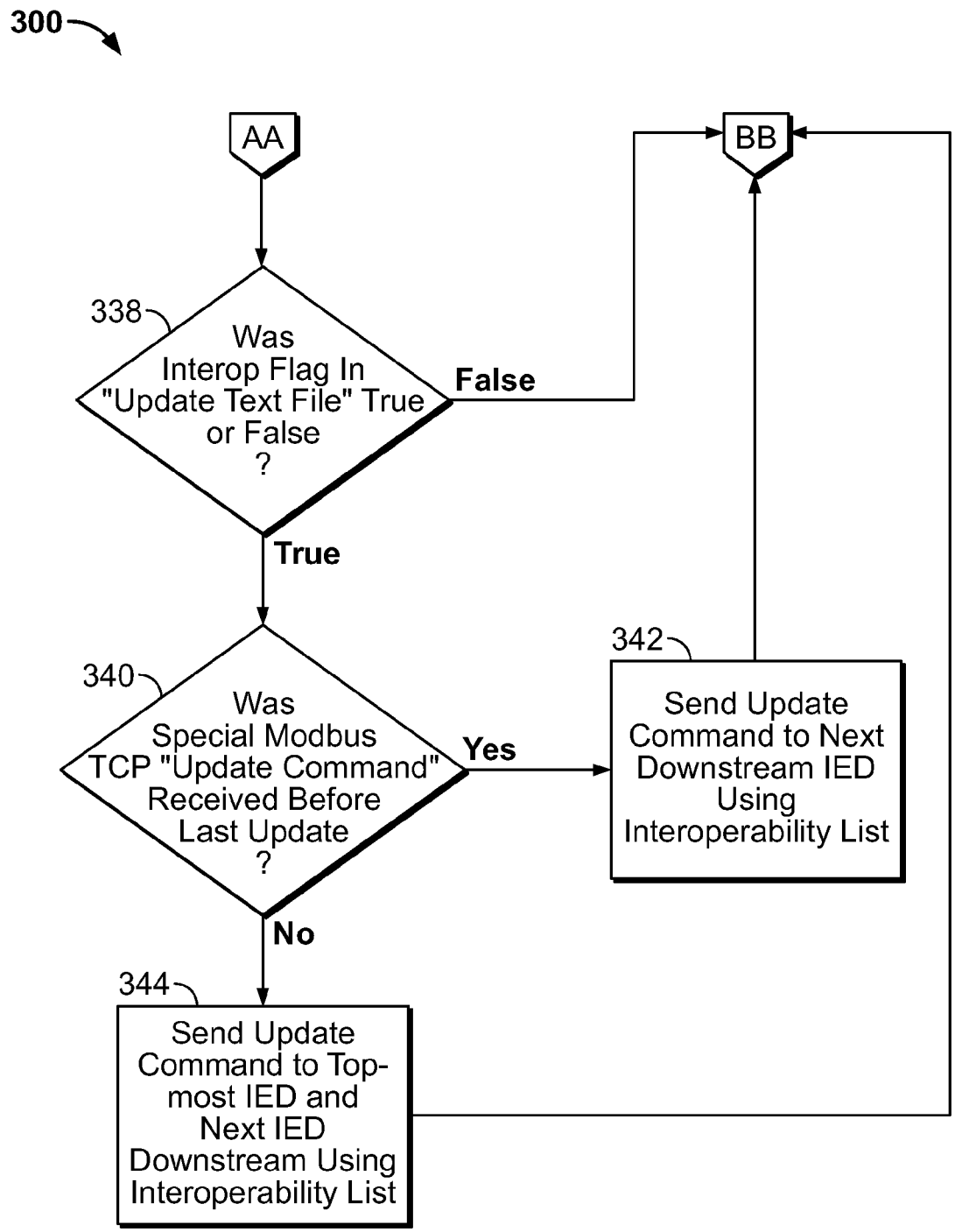

FIGS. 3A-3B are a flow chart diagram of an exemplary automatic update algorithm 300, which corresponds to the firmware stored in the memory 104 of the IED 102. While the IED 102 is running (302), the algorithm 300 determines whether an automatic update interval has been reached as determined by the server polling interval set by the user (304). The algorithm 300 also polls whether an update command has been received from another IED in the monitoring system 106 (306). If either an automatic update interval has been reached or an update command has been received from another IED, the IED 102 logs on to the remote server 110 (308), and retrieves from the server 110 the update file 112, stores the update file 112 in the memory 104, and analyzes the FCP parameter 114*f* in the update file 112 (312). If the firmware version 114*a* specified in the update file 112 is newer than the existing version of the firmware in the memory 104 (310), the algorithm 300 determines whether the FCP parameter 114*f* is greater than the firmware version the IED 102 was originally manufactured with (316). If so, the algorithm 300 causes the IED 102 to send a custom notification message to the user via the transport method selected by the user (320). If the FCP parameter 114*f* is not greater than the firmware version the IED 102 was originally manufactured with, the algorithm 300 determines whether the IED 102 can download the new firmware per the user-enabled update options as described above (314). If not, the algorithm 300 causes the IED 102 to send a custom notification message to the user via the transport method that a new firmware update is available but cannot or will not be downloaded either due to compatibility issues or because the user specified no auto-downloads.

If the update options specified by the user indicates that the IED 102 can automatically download the new firmware file 116 from the remote server 110, the IED 102 sends a notification indicating that the new firmware is available via the transport method (322) and downloads the new firmware file 116 from the remote server 110 and stores the new firmware file 116 in the memory 104 of the IED 102 (324). The algorithm 300 determines whether the CRC of the newly downloaded firmware file matches the firmware file CRC 114*d* in the update file 112 (332). If not, the algorithm 300 determines whether a predetermined number of download retries have been exceeded (326), and if not, causes the IED to re-download the new firmware file 116 from the remote server 110 (324). If the number of download retries have been exceeded (326), the algorithm 300 sends a custom notification message to the user indicating that the number of download retries have been exceeded (320). If a CRC match exists (332), the algorithm 300 causes the IED 102 to update its firmware with the newly downloaded firmware file 116 (334). The algorithm 300 determines whether the update was successful (336), and if so, sends a message to the user notifying the user of the successful update (330); otherwise, the algorithm 300 sends a message to the user notifying the user of an update error (328).

The algorithm 300 determines whether SIC is enabled (318) in the IED 102. If so, the algorithm 300 determines whether the interoperability flag parameter 114*e* in the update file 112 is true or false (338) (FIG. 3B). If true, the algorithm 300 determines whether the special Modbus/TCP update command described above was received before the last firmware update (340). If so, the algorithm 300 sends the update command to the next downstream IED using the interoperability list that specifies the hierarchical arrangement of the IEDs 102 in the utility monitoring system 106. If the update command was not received before the last firmware update, the algorithm 300 sends the update command to the topmost IED 102*a* and the next IED downstream 102*d* (assuming the "seed" IED in this example is IED 102*b*) using the interoperability list (344).

In addition to being connected to one another, the IEDs can also be connected to monitoring software running on a host computer (not shown) coupled to the network 108. It is important that any firmware update made to an IED 102 in the utility monitoring system 106 be compatible with the entire monitoring system 106. For example, an updated firmware may render a specific data field inoperable or unreadable to the user or to the monitoring system 106, or custom programming in the IED 102 may be overwritten by a firmware update. When an IED's firmware requires updating, the IED ensures that the updated firmware will not compromise the entire monitoring system 106. To do so, at least two implementations are described, which are not mutually exclusive and can be implemented together.

According to a first implementation, the monitoring software running on the host computer includes a compatibility checklist for IED firmware compatibility. The IED automatically queries the monitoring software to confirm that the new firmware update will be acceptable to the monitoring system 106 and to the IED itself. It is important to note that the IED does both validations—for itself to ensure the update will continue to push valid monitored data from the IED, and for the monitoring system 106 to ensure that it can still connect to and communicate the required data and information needed by the monitoring system 106. While this compatibility check is carried out automatically without user intervention, the user can optionally modify or add to the compatibility checklist. Alternately, each new firmware includes a portion of data or information that conforms which versions of firmware it is backwards and/or forwards compatible with, and which portions it is not. Once the IED has verified this information, an indication of the success or failure of this verification is added to the notification message sent to the user. In the event of a failure notification, the message informs the user whether the failure occurred due to system incompatibility or due to a corrupt firmware condition (e.g., a failed CRC check).

According to a second implementation, the IEDs 102 in the monitoring system 106 are updated in order based on the hierarchical arrangement of the IEDs 102 in the monitoring system 106. Top-level IEDs are updated first, followed by downstream IEDs requiring updates. A top-level IED includes, for example, an IED connected to the A and B distribution paths. A second-level IED includes the IED monitoring the main switchgear on one of the distribution paths. A third-level IED includes IEDs monitoring the feeders, and so forth (see FIG. 1). By updating in this top-down manner, the new firmware can be validated before more downstream IEDs requiring updating are carried out. In addition, if a compatibility error occurs during a top-down update, the monitoring system 106 can be troubleshot and investigated quickly compared to a different updating scheme, such as a random one.

When a "tagged" IED 102 receives a notification to update its firmware, the tagged IED checks an upstream IED before it downloads and executes the firmware update. If the upstream IED has received a notification to update its firmware but has not executed or completed the update yet, the tagged IED waits and checks at a later time. If multiple contacts are made to the upstream IED, and the tagged IED is unable to acquire an authorization to update its firmware, the tagged IED sends a failure notification indicating that it was unable to complete the firmware update despite being requested to do so. Alternately, an update notification instruction is sent from an IED to downstream IEDs, which can be similar devices (and thus need the same update) or different devices (and thus may not need the same update), the IED can ignore the update notification instruction and simply forwards the instruction to the downstream IEDs or other IEDs at its hierarchy level.

Any of the algorithms disclosed herein include machine readable instructions for execution by: (a) a microprocessor, (b) a microcontroller, and/or (c) any other suitable processing device. It will be readily understood that the IEDs 102 each includes such a suitable processing device. Any algorithm, such as the algorithms 200, 300, disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts or functional block diagrams depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically updating an existing firmware file stored in a memory of an intelligent electronic device (IED) communicatively coupled to a network in a monitoring system, comprising:
the IED logging on to one of one or more remote servers on a periodic basis;
downloading, by the IED, from one or more remote servers after logging on, an update file that includes a version of a firmware file and a filename of the firmware file;
determining, in the IED, whether the firmware version specified in the update file is updated compared to a version of an existing firmware file;
responsive to the firmware version specified in the update file being updated compared to the version of the existing firmware file, communicating from the IED to the remote server an instruction to download to the IED an updated firmware file specified in the update file;
receiving at the IED from one of the one or more remote servers, the updated firmware file; and
responsive to a first criterion being satisfied, automatically updating the existing firmware file stored in the memory of the IED with the updated firmware file;
wherein the update file further includes an interoperability flag indicating to the IED whether to notify other compatible IED's in the network that the firmware update is available.

2. The method of claim 1 wherein the first criterion is satisfied in response to the interoperability flag indicating that the IED notify the other compatible IED's in the network that the firmware update is available.

3. The method of claim 1, further comprising measuring an electrical characteristic via a sensor in the IED and producing, by the IED, data representing the electrical characteristic.

4. The method of claim 1, wherein the remote server is a remote file transfer protocol (FTP) server, and wherein the communicating to the remote FTP server includes communicating authentication information to an Internet Protocol (IP) address of the remote FTP server.

5. The method of claim 4, wherein a folder on the remote FTP server in which the updated firmware file is stored contains the updated firmware file and the update file.

6. The method of claim 1, wherein the first criterion is whether a firmware compatibility parameter is satisfied, the firmware compatibility parameter indicating whether the updated firmware file is compatible with the IED.

7. The method of claim 1, wherein the first criterion is whether the firmware version of the firmware file specified in the update file is newer than the version of the existing firmware file.

8. The method of claim 1, wherein the first criterion is whether the updated firmware file includes any errors as determined by an error detecting code applied to the updated firmware file.

9. The method of claim 1, wherein the update file further includes a cycle redundancy check (CRC) number associated with the updated firmware file.

10. The method of claim 9, further comprising, in response to the CRC number indicating an error in the updated firmware file, re-attempting to download from the remote server for a predetermined number of tries the updated firmware file until the updated firmware file produces satisfies the cyclic redundancy check.

11. The method of claim 1, wherein the update file further includes at least one of a firmware compatibility parameter indicating whether the updated firmware file is compatible with the IED or a release date of the updated firmware file.

12. The method of claim 1, wherein the update file further includes a release date of the updated firmware file, a cyclic redundancy check number associated with the updated firmware file, and a firmware compatibility parameter indicating whether the updated firmware file is compatible with the IED.

13. The method of claim 1, further comprising storing, in the memory of the IED, a representation of a hierarchy of the IEDs coupled to the network, the hierarchy indicating how the IEDs are linked to one another in the monitoring system and their relative locations in the hierarchy to one another.

14. The method of claim 1, wherein the interoperability flag indicates that the IED is to notify other EDs, the method further comprising transmitting from the IED to a second IED in the network via a communication channel outside the network, the second IED being compatible with the IED, an instruction to the second IED to cause the second IED to update an existing firmware file stored in the second IED.

15. The method of claim 14, further comprising, prior to the transmitting the instruction to the second IED, scanning the network within a predetermined address range to build an interoperability list that includes, for each of the IEDs in the network, a network address of each of the IEDs in the network and an associated system position of each of the IEDs in a hierarchy indicating how the IEDs are linked to one another in the monitoring system and their relative locations in the hierarchy to one another, the method further comprising receiving, at the IED, from the second IED a string read from a predetermined register in the memory of the second IED, the string representing the system position of the second IED in the hierarchy; and responsive to the receiving the string, storing, in the interoperability list, the network address of the second IED and the system position of the second IED.

16. The method of claim 15, further comprising, prior to the transmitting the instruction to the second IED, reading the interoperability list by the IED to determine the network address of the second IED and the associated system position of the second IED in the hierarchy.

17. The method of claim 14, further comprising storing, in the memory of the IED, a representation of a hierarchy of the IEDs coupled to the network, the hierarchy indicating how the IEDs are linked to one another in the monitoring system and their relative locations in the hierarchy to one another, and wherein the second IED is a topmost IED in the hierarchy.

18. The method of claim 14, further comprising, responsive to the second IED updating the firmware file stored in the second IED, transmitting, from the second IED to a third IED in the network, the third IED being compatible with the IED, the instruction to cause the third IED to update an existing firmware file stored in the third IED.

19. The method of claim 18, further comprising transmitting, from the IED to a fourth IED in the network, the fourth IED being compatible with the IED and downstream of the IED in the hierarchy, the instruction to cause the fourth IED to update an existing firmware file stored in the fourth IED.

20. The method of claim 1, wherein the IED is an Ethernet-enabled power monitoring or control device that includes an Ethernet port.

21. The method of claim 1, further comprising communicating via the IED a notification indicating availability of the firmware update.

22. The method of claim 21, wherein the communicating the notification is carried out according to a network time protocol (NTP), a simple mail transport protocol (SMTP), a short message service (SMS) protocol, or a Modbus serial communications protocol over a transmission control protocol (Modbus/TCP).

23. The method of claim 22, wherein the IED includes a modem that is operable in a global system for mobile communications (GSM) network.

24. The method of claim 21, wherein the notification further includes an internet protocol (IP) address of the IED, a date and time that the notification was constructed, the version of the existing firmware file stored in the memory of the IED, and the firmware version of the updated firmware file.

25. The method of claim 24, wherein the notification further includes at least one of a location of the IED in the network, a model number of the IED, or a release date of the firmware update.

26. The method of claim 1, further comprising receiving, at the IED, a selection of an update option indicating whether to download the updated firmware file or whether to install the updated firmware file.

27. The method of claim 26, wherein the update option indicates a first option to send a notification that the updated firmware file is available and download the updated firmware file to the IED or a second option to send a notification that the updated firmware file is available and to both download the updated firmware file to the IED and automatically install the updated firmware file on the IED or a third option to neither download the updated firmware file to the IED nor install the updated firmware file on the IED and to send only a notification that the updated firmware file is available.

28. The method of claim 26, wherein the receiving from the remote server the updated firmware file is initiated responsive to receiving an indication from a user locally to the IED or remotely from the IED to download the updated firmware file to the IED.

29. A method of automatically updating an existing firmware file stored in a memory of an intelligent electronic device (IED) communicatively coupled to a network in a monitoring system, comprising:
the IED logging on to one or one or more remote servers on a periodic basis;
receiving at the IED from a second IED coupled to the network in the monitoring system, an indication to update the existing firmware file stored in the memory of the IED after logging on to one or the one or more of the remote servers;
responsive to the IED receiving the indication from the second IED, receiving at the IED from the one or more remote servers an updated firmware file that includes a version of a firmware file and a filename of the firmware file;
determining, in the IED, whether the firmware version specified in the update file is updated compared to a version of the existing firmware file;
responsive to the firmware version specified in the update file being updated compared to the version of the existing firmware file, communicating from the IED to the remote server an instruction to download to the IED the updated firmware file specified in the update file;
receiving at the IED from one of the one or more remote servers, the updated firmware file; and
responsive to a first criterion being satisfied, automatically updating the firmware file stored in the memory of the IED with the updated firmware file.

30. The method of claim 29, further comprising:
measuring an electrical characteristic of an electrical utility system indicating an operational characteristic of the electrical utility system via a sensor in the IED and producing, by the IED, data representing the electrical characteristic;
receiving from the remote server an update file that includes a version of the updated firmware file, a release date of the updated firmware file, a file name of the updated firmware file, a firmware compatibility parameter indicating whether the updated firmware file is compatible with the IED;
responsive to receiving the update file, communicating from the IED to the remote server an instruction to download to the IED the updated firmware file.

31. A method of automatically updating an existing firmware file stored in a memory of an intelligent electronic device (IED) communicatively coupled to a network in a monitoring system, comprising:
receiving at the IED from a second non-server IED coupled to the network in the monitoring system, an indication to update the existing firmware file stored in the memory of the IED, wherein the second IED is situated immediately downstream of the IED in a hierarchical structure of the network;
responsive to the IED receiving the indication from the second IED, receiving at the IED from one or more remote servers an updated firmware file that includes a version of a firmware file and a filename of the firmware file, wherein the indication is included in a notification communicated between the IED and the second IED via a communication channel outside the network, the notification also including an indication to update the existing firmware file stored in the memory of the IED;
determining, in the IED, whether the version specified in the updated firmware file is updated compared to a version of the existing firmware file;
responsive to the version specified in the updated firmware file being updated compared to the version of the existing firmware file, communicating from the IED to the remote server an instruction to download to the IED the updated firmware file specified in the update file;
receiving at the IED from one of the one or more remote servers, the updated firmware file;
responsive to a first criterion being satisfied, automatically updating the existing firmware file stored in the memory of the IED with the updated firmware file; and
responsive to the IED receiving the notification from the second IED, identifying a third IED immediately downstream from the IED in the hierarchical structure, and communicating the notification to the third IED via the communication channel, to thereby update IEDs in the network in top-down sequence according to the hierarchical structure.

32. The method of claim 31, further comprising: prior to the automatically updating, checking the third IED immediately upstream of the first IED in the hierarchical structure to determine whether the third IED has completed a firmware update, and, if the third IED received a notification to complete a firmware update, but is not yet complete, wait and check the third IED at a later time before completing the updating.

* * * * *